(12) United States Patent
Astrike (10) Patent No.: US 10,538,218 B2
(45) Date of Patent: Jan. 21, 2020

(54) VEHICLES INCLUDING PILLAR GARNISH ASSEMBLIES WITH SEAT BELT LATCH-RECEIVING STRUCTURES

(71) Applicant: Toyota Motor Engineering & Manufacturing North America, Inc., Erlanger, KY (US)

(72) Inventor: Logan R. Astrike, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 119 days.

(21) Appl. No.: 15/654,800

(22) Filed: Jul. 20, 2017

(65) Prior Publication Data
US 2019/0023221 A1 Jan. 24, 2019

(51) Int. Cl.
| | |
|---|---|
| *B60R 22/06* | (2006.01) |
| *B60R 22/34* | (2006.01) |
| *B62D 25/04* | (2006.01) |
| *B62D 65/14* | (2006.01) |
| *A44B 11/25* | (2006.01) |

(52) U.S. Cl.
CPC .......... *B60R 22/06* (2013.01); *A44B 11/2503* (2013.01); *B60R 22/34* (2013.01); *B62D 25/04* (2013.01); *B62D 65/14* (2013.01)

(58) Field of Classification Search
CPC ....... B60R 22/06; B60R 13/025; B60R 22/02; B60R 11/02; B60R 22/34; B60R 2022/021; B60R 2011/0022; B60R 2013/0287; B62D 25/04; B62D 65/14; A44B 11/2503
See application file for complete search history.

(56) References Cited

U.S. PATENT DOCUMENTS

| | | | | |
|---|---|---|---|---|
| 2,165,594 A | * | 7/1939 | Waterhouse, Jr. | B62D 25/04 49/144 |
| 5,957,499 A | | 9/1999 | Kempf | |
| 6,854,766 B2 | * | 2/2005 | Kobayashi | B60R 22/023 280/801.1 |
| 7,625,011 B2 | | 12/2009 | Nevaux | |
| 9,776,595 B2 | * | 10/2017 | Taylor | B60R 22/12 |
| 2010/0219625 A1 | * | 9/2010 | Gomi | B60R 22/02 280/807 |
| 2018/0304821 A1 | * | 10/2018 | Delaruelle | B60R 11/02 |

FOREIGN PATENT DOCUMENTS

| | | |
|---|---|---|
| CN | 104057911 A | 9/2014 |
| CN | 105189216 A | 12/2015 |
| DE | 102010035732 A1 | 3/2012 |
| EP | 1371531 B1 | 10/2007 |

* cited by examiner

*Primary Examiner* — Darlene P Condra
(74) *Attorney, Agent, or Firm* — Dinsmore & Shohl LLP (57) ABSTRACT

A seat belt assembly, a garnish to cover a vehicular pillar and a method of making a vehicular pillar garnish. The garnish used in the assembly cooperates with a belt with a connected latch such that when the latch is disengaged from a corresponding seat belt buckle, a latch-receiving structure with a recessed portion formed in the garnish prevents contact with latch such that vibratory movement imparted to the disengaged latch as a result of vehicular movement does not result in the latch knocking or banging against the garnish. The recessed portion includes more than one region that may be used to provide extra functionality to the garnish, such as one or more of temporary storage for a portable electronic device and seat belt rerouting.

19 Claims, 5 Drawing Sheets

VEHICLES INCLUDING PILLAR GARNISH ASSEMBLIES WITH SEAT BELT LATCH-RECEIVING STRUCTURES

TECHNICAL FIELD

The present specification relates generally to devices and methods for avoiding contact between a seat belt latch and adjacent vehicular structure during periods of vehicular operation when a seat belt to which the latch is attached is not in use, and more particularly to such devices and methods that do so while providing extra features in addition to such contact avoidance.

BACKGROUND

Seat belt systems that are used to provide passenger restraint in a vehicle typically include a belt, a buckle, a latch and a retractor. When deployed through engagement of the latch and buckle, the seat belt system forms what is commonly known as a three-point restraint in that the latch secures a passenger to a seat at three locations: at one shoulder and on both sides of the waist. End locations of the seat belt system that generally correspond to these three points are often secured to rigid vehicular structure, such as floors, roofs, pillars or the like. During periods where the seat belt system is not in use, the belt and the attached latch are often vertically stored in a partially-taut retracted position along a piece of trim garnish that, in turn, may provide an aesthetic cover for an adjacent B-pillar, C-pillar or D-pillar. In this retracted position, the latch may be prone to making intermittent contact with the adjacent garnish in response to vibrations produced by movement during periods of vehicular operation. This contact in turn creates undesirable noise in the passenger compartment.

Prior attempts at avoidance of such noise have not been wholly satisfactory. For example, an additional retention piece in the form of a hook, clip or the like may be placed along the garnish to provide some measure of belt or latch vibration reduction. In addition to only being partially effective at reducing the noise associated with latch knocking, it is visually unappealing, and further increases manufacturing cost and complexity. In another conventional form, a conformal rubber or plastic piece may be added in or around the location on the garnish that is adjacent the latch, the intent being to at least partially dampen the knocking by having the metal latch contact a more compliant conformal piece during excessive vibrations. As with the previous approach, this approach further increases manufacturing cost and complexity. In yet another form, an over-molded layer of compliant material (such as the previously-mentioned rubber or plastic) may be placed around a significant portion of the latch, leaving only the remote tongue exposed. The efficacy of such an approach to achieve a significant measure of noise reduction has been shown to be at best modest, while—as with the other two approaches—involves increased manufacturing cost and complexity.

SUMMARY

According to one embodiment of the present disclosure, a vehicular seat belt assembly is disclosed. The assembly includes a garnish, a belt with a connected latch and a buckle selectively cooperative with the latch to be in either an engaged position or a disengaged position. The garnish—which is configured to cover a vehicular pillar—is disposed adjacent the belt and latch in such a way that when the latch is in the disengaged position, a latch-receiving structure that includes a recessed portion that is formed within an aperture in the garnish A-surface and shaped with first and second regions avoids contact with the latch. Thus, because the first region is deep and wide enough, it ensures that even as portions of the disengaged latch may move into the first region, vibratory movement imparted to the latch as a result of vehicular movement does not result in the latch knocking or banging against the garnish.

According to another embodiment of the present disclosure, a vehicular pillar garnish is disclosed. The garnish is configured to at least partially cover a vehicle pillar and includes an A-surface configured to face a passenger compartment when the garnish is placed over the pillar and a B-surface configured to face away from the passenger compartment. The A-surface has an aperture that provides an opening for a latch-receiving structure that defines a recessed portion that is shaped with first and second regions where the first region of the recessed portion is deep enough and wide enough that the movement of an adjacent latch that is suspended from a seat belt during a period where the seat belt is not being used such that the latch does not contact the garnish.

According to another embodiment of the present disclosure, a method of making a vehicular pillar garnish is disclosed. The method includes providing a heated material to at least a portion of an injection molding assembly, forcing the heated material into a mold that is shaped as a garnish configured to cover a vehicular pillar, cooling the material in the mold and ejecting the cooled material from the mold. The garnish that is formed within the mold includes an A-surface that is configured to face a passenger compartment in its as-installed location within a vehicle, while a generally opposing B-surface is configured to face away from such passenger compartment. The mold is further shaped in that an aperture is formed in the A-surface, while a latch-receiving structure includes a recessed portion that is contiguous with the aperture. The shape of the recessed portion is such that when the garnish is in its as-installed location within a vehicle, at least a first region of such recessed portion is deep enough and wide enough to avoid contact with an adjacent latch that is suspended from a seat belt during disengagement of the latch from a seat belt buckle.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include vehicular seat belt assemblies that reduce passenger compartment noise associated with having an unused seat belt latch contacting adjacent components during vehicle movement. A latch-receiving structure includes a recessed portion formed in the garnish that covers a vehicular pillar (whether B-pillar, C-pillar or D-pillar) and is sized to create a negative space that is deep enough to permit the latch a relatively free range of movement in response to vehicle vibrations while still avoiding contact with adjacent surfaces of the garnish. In some embodiments, the latch-receiving structure may include an extended region that may additionally function as the belt rerouter. In some embodiments, the additional depth enhancement of the extended region may also be shaped such it may also act as a storage location for mobile phones or other thin-profile or small items. The dimensions of the recessed portion—either with or without the extended region—allows the latch and connected portion of the belt to move in the depth direction of the recess without contact between the relatively hard surfaces of the latch and the latch-receiving structure. Instead, contact is limited to that of the more compliant webbing that makes up the belt, which in turn produces a much more muted acoustic disturbance when contact between the belt and the garnish occurs.

Figure 1:
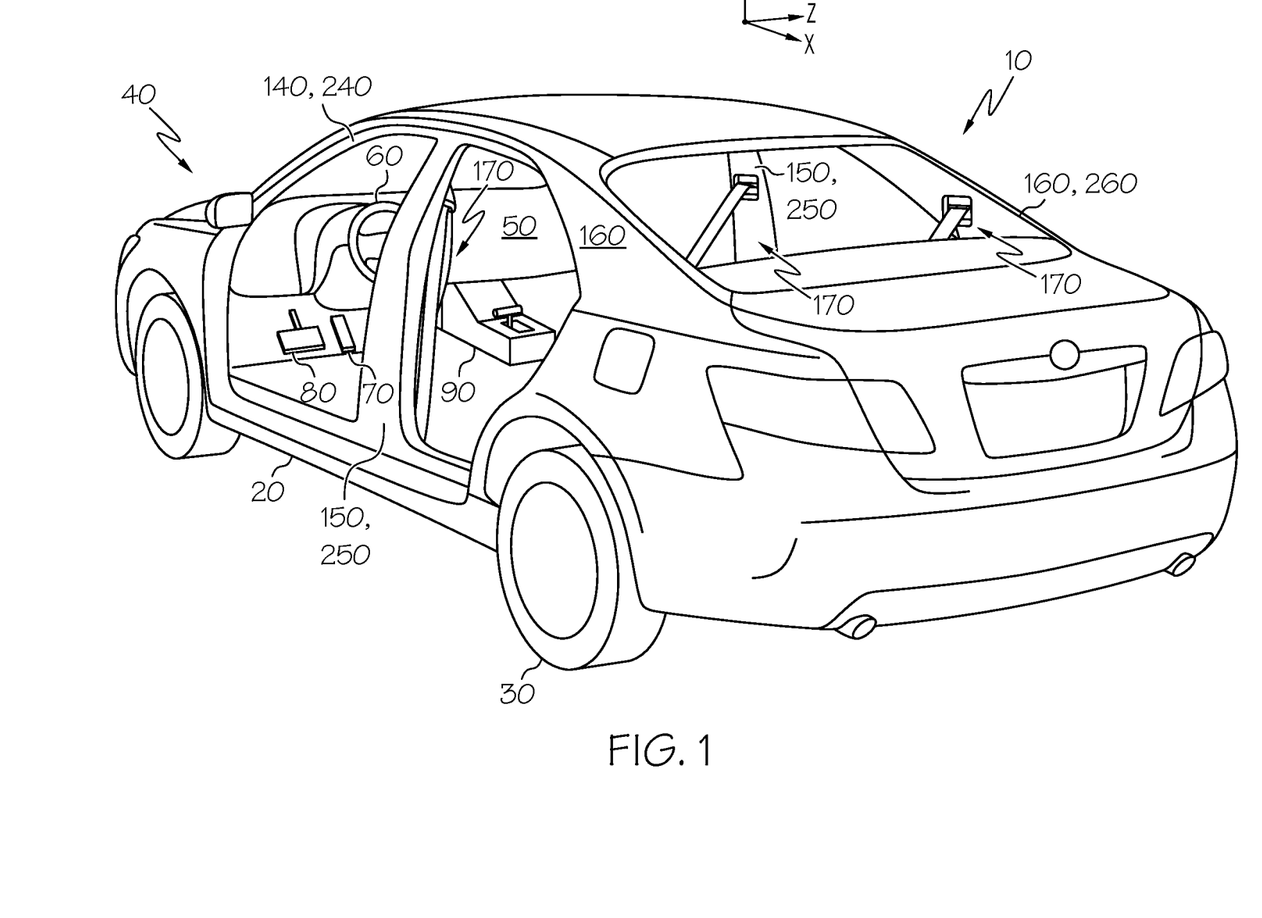
FIG. 1 depicts a simplified rear perspective view of vehicle with a seat belt assembly in accordance with one embodiment of the present disclosure.
Figure 2:
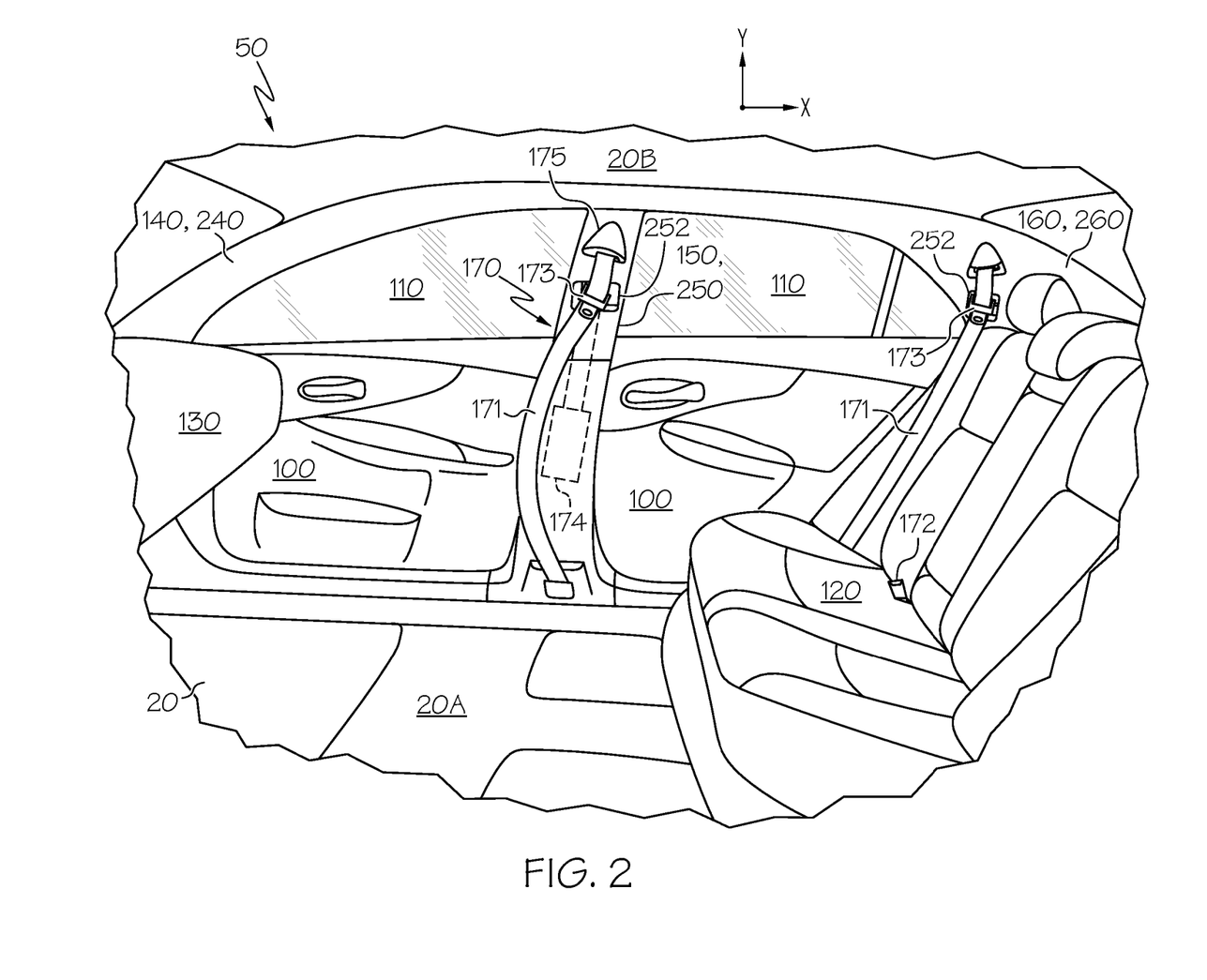
FIG. 2 depicts an interior view of the vehicle of FIG. 1.

Referring first to FIGS. 1 and 2, a motor vehicle 10 is shown in space where the Cartesian coordinates include orthogonal directions associated with the vehicle's respective horizontal longitudinal, horizontal lateral and vertical height axes X, Y and Z. As such, the lengthwise dimension of vehicle 10 is collinear with the longitudinal axis X, while the height dimension of the vehicle 10 is collinear with the height axis Y and the widthwise dimension of the vehicle 10 is collinear with the lateral axis Z. As such, reference to a particular component or portion thereof—as well its orientation along or movement within a particular dimension—will be understood to be within the context of the Cartesian coordinates discussed herein, and that slight deviations from the same due to minor misalignment of such components relative to such a spatial reference system are permissible without any loss in generality, and that all such alignments relative to such a system are deemed to be within the scope of the present disclosure.

The vehicle 10 includes a chassis 20 with a plurality of wheels 30 at least one of which is configured as a driving wheel to propel the vehicle 10 upon receipt of suitable motive power. Chassis 20 may either be of body-on-frame or unibody construction, and both configurations are deemed to be within the scope of the present disclosure. Moreover, while the particular vehicle 10 configuration depicted is a four-door sedan, it will be appreciated that other vehicular forms, including coupes, sport utility vehicles (SUVs) minivans or the like are also within the scope of the present disclosure. A motive power unit (not shown) is situated in a forward compartment 40 and may be configured as a conventional internal combustion engine (ICE), battery pack, fuel cell stack or a hybrid combination of one or more of the above may be situated in or on the chassis 20 to provide a source of torque or propulsive power to the vehicle 10. A passenger compartment 50 is formed inside the chassis 20 and serves not only as a place to transport passengers and cargo, but also as a place from which a driver may operate vehicle 10 through one or more of a steering wheel 60, accelerator (or throttle) pedal 70, brake pedal 80 and shifter 90 through cooperation with the wheels 30, motive power unit, transmission and other systems. It will be appreciated that the vehicle 10 is shown in a simplified manner, and that in actuality it includes front doors that have been removed from FIG. 1 for easier identification of portions of the passenger compartment 50. Likewise, vehicle 10 includes a front row of seats that have been removed from FIGS. 1 and 2 for easier identification of otherwise visually obscured seat belt components that will be discussed in more detail as follows.

Referring with particularity to FIG. 2, additional details of the passenger compartment 50 are shown. Chassis 20 extends from a floor 20A to a roof 20B and provides a basic frame-like structure to support the various components that enclose or make up the passenger compartment 50. Examples of such enclosing components may include doors 100 and windows 110, while examples of components such as seats 120 (of which only a rear seating row is presently shown) and dashboard 130 (as well as the controls used for vehicle 10 operation) are understood to make up the passenger compartment 50. Various pillars 140, 150 and 160 are also part of the basic frame-like structure that makes up chassis 20 in that they extend in a generally vertical manner from the floor 20A to the roof 20B. In the illustrated embodiment, pillar 140 is an A-pillar (that is to say, any pillar that is entirely forward of a transverse vertical plane passing through the seating reference point of the driver's seat), while pillar 150 is a B-pillar (that is to say, the forwardmost pillar on each side of the vehicle 10 that is, in whole or in part, rearward of a transverse vertical plane passing through the seating reference point of the driver's seat, unless there is (a) only one pillar rearward of that plane and it is also a rearmost pillar or (b) a door frame rearward of the A-pillar and forward of any other pillar or rearmost pillar). Within the present context, the pillar 150 is often referred to as a post in that its generally vertical extension provides a rigid connection between the floor 20A and roof 20B of a two-door coupe or a four-door sedan. As mentioned previously, there are various particular vehicle 10 configurations—whether a two-door coupe, four-door sedan, SUV, minivan, van, truck, crossover or the like—that employ one or more of pillars 140, 150 and 160 as part of the structural makeup of chassis 20. Depending on the particular configuration of vehicle 10, there may be additional pillars such as the previously-mentioned D-pillars that are normally present toward the rear of larger vehicles such as minivans, vans and some larger SUVs.

In addition to providing structural reinforcement to the passenger compartment 50, the pillars 140, 150 and 160 provide mounting structure for other components, such as the doors 100 and windows 110. It will be appreciated that depending on the configuration of chassis 20, the pillars 140, 150, 160 may be affixed to or integral with other structural components within vehicle 10, such as fenders, walls, wheel wells, firewall, sub-frame or the like. As will be discussed in more detail in conjunction with FIGS. 3 through 5A, these pillars 140, 150 and 160 are hidden from view from an observer in the passenger compartment 50 by decorative trim, fairings or related garnish 240, 250, 260 in order to present a more aesthetically-pleasing appearance to such observer. In one form, the garnish 240, 250, 260 is shaped to have a substantially conformal fit over their respective pillars 140, 150, 160 such that dimensionally they occupy the same general amount of shape and space when viewed from the passenger compartment 50 as that of the underlying pillars 140, 150, 160. Within the present context, garnish-specific discussion will use garnish 250 as the corresponding pictoral representation, although it will be understood that such discussion may apply to any garnish that is covering a B-pillar, C-pillar or D-pillar.

Numerous seat belt assemblies 170 are placed within various locations within the passenger compartment 50 in order to provide passenger restraint in the event that one or more passengers experience sudden acceleration or deceleration attendant to certain vehicular maneuvers, such as impact of the of vehicle 10 with another vehicle, stationary object or the like. Although shown as being placed adjacent the B-pillar 150, it will be appreciated that seat belt assembly 170 may be installed at other pillar members such as C-pillar 160 farther rearward along the longitudinal X-axis of vehicle 20. In one embodiment, seat belt assembly 170 may be configured as a three-point restraint system where a seat belt 171, a buckle 172, a latch 173, a spring-based retractor 174 and various mounting locations and guidance paths help to provide passenger restraint within seat 120. In such an embodiment, one end of seat belt 171 may be affixed to the chassis 20 in a location near a lateral edge of the floor 20A, while the other end may be provided through a belt pivot location, such as a carrier attachment 175 (which may or may not be slidably movable along a vertical dimension of the pillar 150 and garnish 250) and affixed to retractor 174 that is in turn is rigidly attached to the chassis 20 through the adjacent pillar 150 or floor 20A. Although described and partially shown as a three-point restraint system, seat belt assembly 170 may be configured to conform to any particular vehicle design or vehicle compartment design, and may further be a four-point restraint system, five-point restraint system or the like. The materials used to make up the seatbelt assembly 170 may include a fabric or webbing for the seat belt 171, as well as metal or plastic for various parts of the buckle 172, latch 173 and retractor 174.

Figure 3:
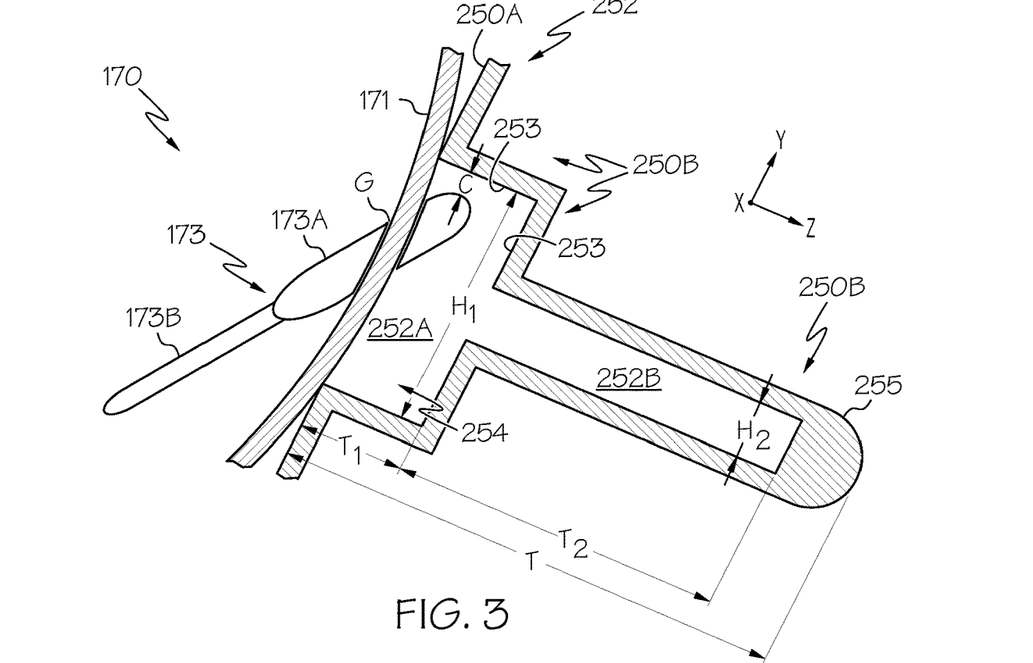
FIG. 3 depicts a side elevation cutaway view of the cooperation of a seat belt, latch and garnish with integrally-formed recessed portion in accordance with one embodiment of the present disclosure.
Figure 5A:
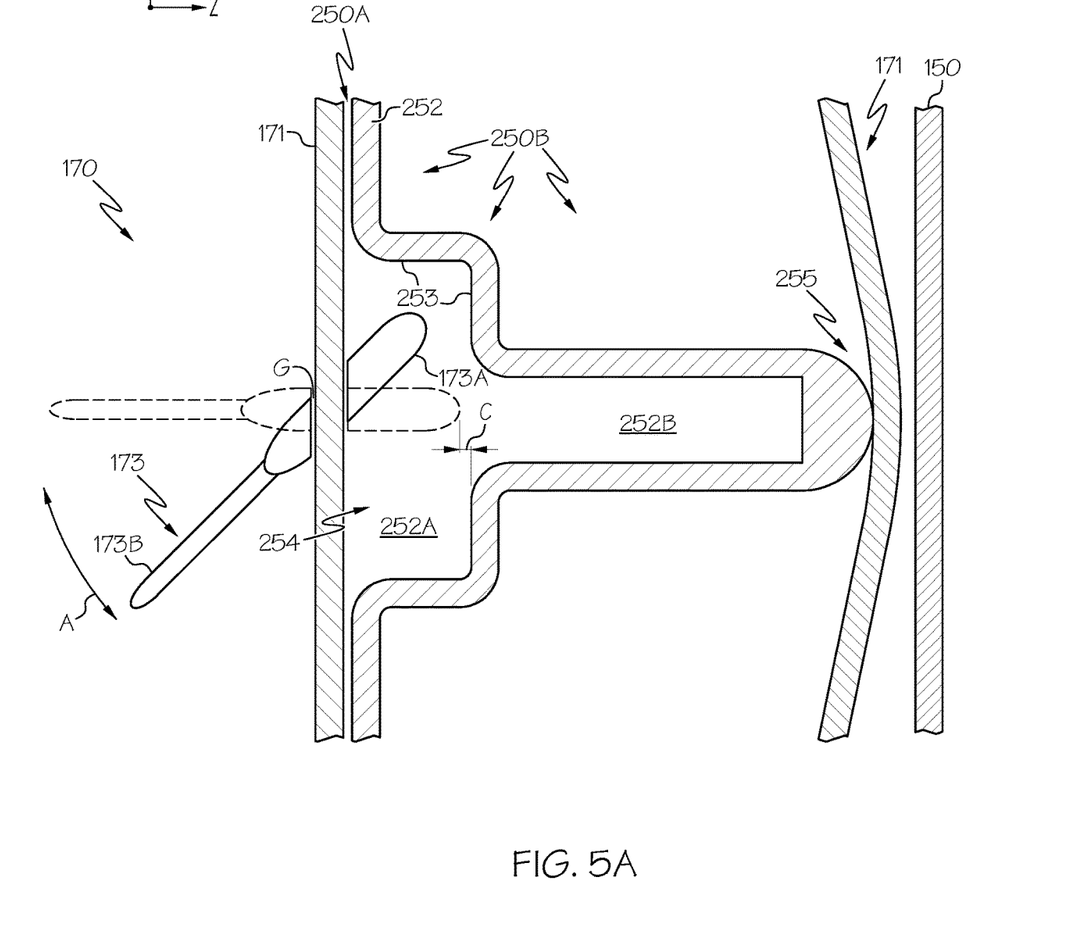
FIG. 5A depicts a general view of the cooperation between the recessed portion and the seat belt in a region between the garnish and a vehicular pillar where the recessed portion may act as a personal communications device storage and seat belt rerouter in accordance with one embodiment of the present disclosure.

Referring next to FIGS. 3 and 5A, a side cutaway view shows the latch 173 and the garnish 250 with a latch-receiving structure 252 that includes a recessed portion provided therein with first region 252A and second region 252B. The latch 173 may include opposing ends 173A and 173B one of which may include a cutout with which to engage buckle 172 of FIG. 2 that, as with the one end of seat belt 171, may be affixed to the chassis 20, although in this case in a location near the center of the floor 20A. As can be seen, the web thickness of seat belt 171, in conjunction with the size of the opening in the latch 173 that accepts the web, is such that a gap G is formed that permits some limited range of slidable or pivoting movement of the latch 173 relative to the belt 171. While such gap G is useful in that the enabled sliding or pivoting movement of latch 173 is ergonomically beneficial to a passenger who is trying to engage the seat belt assembly 170, the gap G also allows the latch 173 a degree of movement that—in response to vehicle-based vibrations or related movement—can make noise by contacting the adjacent garnish 250 absent the recessed portion of the latch-receiving structure 252 discussed herein.

The latch-receiving structure 252 and recessed portion are provided adjacent an A-surface 250A of the garnish 250 at a location that it is substantially aligned along the Y-axis with the latch 173 when the latter is disengaged from the seat belt buckle 172 and the belt 171 is in a substantially taut condition, such as that which occurs when tension from retractor 174 pulls belt excess or reserve back into a belt housing portion of the retractor 174. As used herein, the A-surface 250A is the visible or exposed surface that faces the passenger compartment 50, while the non-visible surface that faces away from the passenger compartment 50 toward the pillar is a B-surface 250B. The latch-receiving structure 252 extends along the lateral Y-axis from the A-surface 250A and toward an underlying pillar 150, forming an aperture 254 at the A-surface 250A. The view shows that due to the size and shape of the aperture 254 and contiguous latch-receiving structure 252, contact between the latch 173 and the garnish 250 is substantially avoided. In particular, even as the latch 173 rotates through an arc A such that its end 173A traverses the recessed portion of the latch-receiving structure 252, the depth T1 of the first region 252A ensures that reduced, if any, contact is made between the relatively hard surfaces of the latch end 173A and a wall 253 of the garnish 250 that defines the first region 252A. Likewise, the size of the recessed portion of the latch-receiving structure 252 is sufficient to ensure that a clearance C exists between its wall 253 and the end 173A of latch 173. In one form, such clearance C may be at least about five millimeters beyond a maximum heightwise extension of the end 173A of latch 173 into the recessed portion of the latch-receiving structure 252. The shape of the recessed portion that makes up the latch-receiving structure 252 is such that at least the first region 252A possesses enough depth (also referred to herein as thickness or thickness dimension) T1 and width (also referred to herein as width dimension) W1 that movement of the latch 173 in the disengaged position during vehicular travel does not result in contact between the latch 173 and the garnish 250.

In one form, the garnish 250 in general and the latch-receiving structure 252 in particular may be made from known resin-based materials suitable for injection molding; in one form, such material may be polypropylene. In one form, the garnish 250 may be a substantially elongate member wherein the cross-sectional area may include a rectangular or concave-shaped B-surface 250B for accepting the corresponding pillar 150. Moreover, the B-surface 250B may include additional structural or rigidity-enhancing features, snap-fit connection features, as well as other features that help the garnish 250 to perform its function within the passenger compartment 50, and that in one form, all such additional features may be integrally-formed into the garnish 250 such that it can be produced by a low-cost injection molding operation, especially if such features avoid or minimize undercuts such that slide-free injection molding associated with at least this part of garnish 250 is enabled. Likewise, the A-surface 250A of garnish 250 may be elongate with a cross-sectional area defined by a rectangular or convex-shape having desirable aesthetic qualities (such as certain color, texture, smoothness, cover fabric or the like) for the benefit of people situated within the passenger compartment 50. As with the B-surface 250B, additional features may be integrally-formed into the A-surface 250A to promote low-cost injection molding. Garnish 250 may be affixed to a pillar 150 using conventional fasteners such as screws, rivets, clips, adhesive or the like. In one form, garnish 250 may be fabricated from one continuous, unitary section, while in another form may be made from multiple sections (such as a lower section and an upper section, but understood to contain more or fewer, depending on the configuration) that can then be fastened together (such as through snap-fit connections or the like). Regardless of whether the garnish 250 is made from a single elongate structure or two or more joinable sections (such as through snap-fit connections using integrally-formed complementary parts), it will be appreciated that it may be made by injection molding in the manner discussed herein.

A portion of the seat belt 171 is configured to rest on or adjacent the portion of the garnish 250 that corresponds to the recessed portion of the latch-receiving structure 252 that is formed within aperture 254. Thus, in addition to covering the adjacent pillar 150 of FIGS. 1 and 2, the garnish 250 is disposed adjacent the belt 171 and latch 173 when the seat belt assembly 170 is not being used such that the latch 173 is in the disengaged position relative to buckle 172. The shape and size of the recessed portion of the latch-receiving structure 252 is such that at least the first region 252A defined therein has sufficient depth along thickness dimension T1, height along a height dimension H1 and width along a width dimension W1 that swinging, vibrating or other movement of the latch 173 in the disengaged position does not result in contact between the latch 173 and the garnish 250 during vehicular travel. Within the present context, such depth or thickness of the first region 252A is that which extends laterally outward away from the passenger compartment 50 and toward the pillar 150. This is also the general direction of the largest expected vibratory or related movement of latch 173 in that the higher rigidity along the width dimension of the belt 171 and latch 173 that extends generally along the X-axis and the relative tautness along the height direction that is substantially collinear with the elongate length of the belt 171 as it extends along a generally vertical Y-axis are generally not as conducive to vibration-induced movement along these respective axes as that of the depth of the thickness dimension T1 associated with the Z-axis. Even so, in one form, the width dimension W1 of the first region 252A is at least as wide as the latch 173, while in another form is wider than the latch 173 by a margin to allow for sideways or pendulum-like movement along the X-axis of the latch 173 and adjacent seat belt 171 portion, even if such movement is not expected to be too great. Relatedly, because the seat belt 171 tends to block the latch 173 from making substantial contact along the height dimension H1, significant margin beyond the footprint defined by the end 173A (and subject to the wall 253 clearance C mentioned above) may not be required. Moreover, by using a latch-receiving structure 252 with the recessed portion in the manner described herein, the need to employ additional components such as a conformal rubber or plastic piece formed around one or both of the garnish 250 and latch 173 may be avoided.

In one form, the height and width dimensions H2 and W2 of the second region 252B are sized and shaped to define a generally rectangular pocket such that portable electronic communication devices such as a mobile phone may be temporarily placed within. In one form, the cavity may be configured such that farther along its thickness or depth dimension T2, the cavity is slightly downward tilted relative to its opening that is formed adjacent the first region 252A, thereby providing an enhanced resistance against such an inserted portable electronic communication device from inadvertently falling out.

Figure 4:
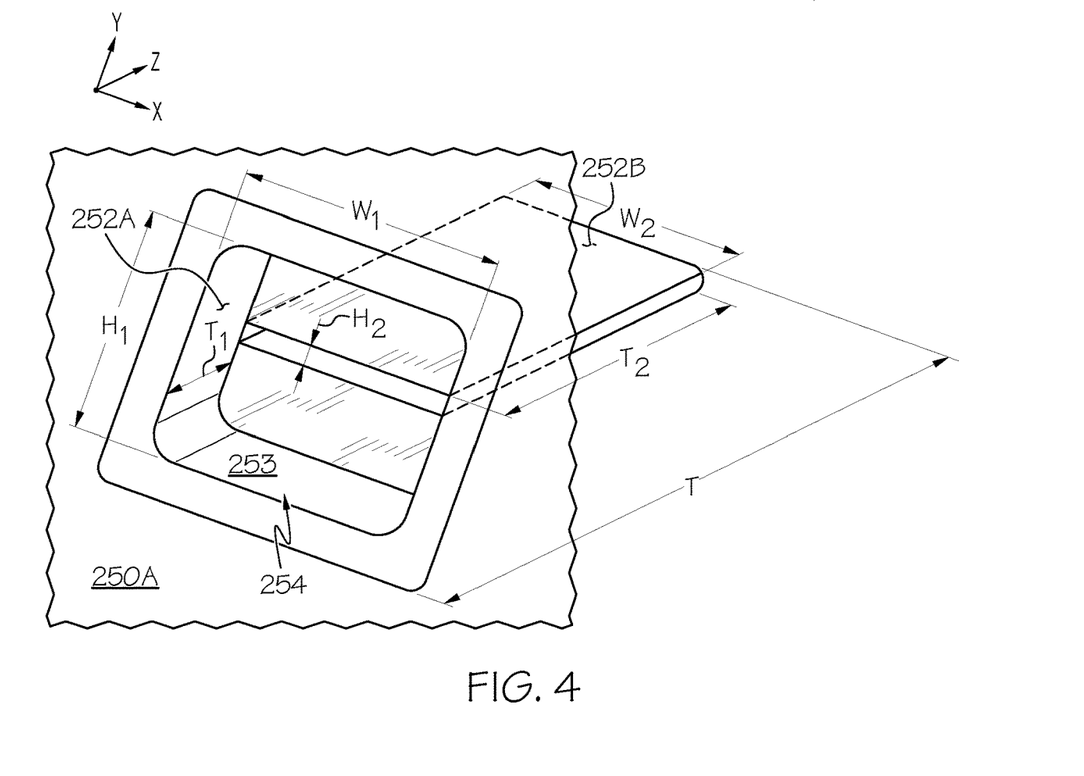
FIG. 4 depicts a perspective view of a portion of an A-surface of the garnish with the recessed portion of FIG. 3 in isolation.

Referring next to FIG. 4, a perspective view of a portion of the A-surface 250A of the garnish of FIG. 3 in isolation shows the first region 252A, the second region 252B and the aperture 254 that is formed in the A-surface to provide an open, contiguous connection between the garnish 250 to the first region 252A, as well as between the first region 252A and the second region 252B. In one form, the first region 252A defines a generally rectangular cross-sectional profile with walls 253, while the second region 252B defines a more exaggerated, but still generally rectangular cross-sectional profile that is sized as a cavity or related compartment to receive a mobile phone or other thin-profile device. As previously mentioned, the dimensions of the first region 252A are such that they facilitate the avoidance of contact between the latch 173 of FIGS. 3 and 5A and the garnish 250. In one form, width W1 and height H1 dimensions of the first region 252A define a surface area that corresponds to aperture 254. In one form, width W1 dimension of the first region 252A is additionally sufficient to allow the insertion of a mobile phone or related personal communication device into the second region 252B that in one form may also define the width W1 dimension. This second region 252B and its placement substantially mimics the relationship between the A-surface 250A and the first region 252A in that a generally open, contiguous passage between the two regions defines a volumetric space into which items may be introduced. Whereas the primary function of the first region 252A is that the item being introduced therein is the end 173A of latch 173, the primary function of the second region 252B is that the item being introduced therein is a mobile phone or other thin-profile rectangular device. In such case, in one form the width, height and thickness dimensions of the second region 252B are those compatible with such mobile phones as presently known or hereafter developed; in one such example, such dimensions may be at least about 75 millimeters for width W2, at least about 10 millimeters for height H2 and at least about 125 millimeters for thickness T2, respectively. As can be seen, the open, contiguous nature of the A-surface 250A to the first region 252A and of the first region 252A to the second region 252B allows ease of non-contact movement of the latch 173 in the first region 252A and temporary storage of the personal communications device in the second region 252B. In another exemplary form, the width W2 dimension may be at least about 80 millimeters. In yet another exemplary form, the width W2 dimension may be at least about 85 millimeters. In still another exemplary form, the width W2 dimension may be at least about 90 millimeters. Likewise, in another exemplary form, the thickness T2 dimension may be at least about 130 millimeters. In yet another exemplary form, the thickness T2 dimension may be at least about 140 millimeters. In still another exemplary form, the thickness T2 dimension may be at least about 150 millimeters.

Referring next to FIG. 5A, it can be seen from clearance C along the depth that coincides with the thickness dimension T of FIGS. 3 and 4 that the depth of the first region 252A extends away from the A-surface 250A by at least about five millimeters beyond a maximum depthwise extension of the end 173A of latch 173 into the recessed portion of the latch-receiving structure 252, even when the latch 173 is subject to motion or vibration-induced rotation about a pivoting axis relative to the seat belt 171. In this way, the clearance C is similar to that which may also be present between the end 173A of latch 173 and a wall 253 of the latch-receiving structure 252, as shown and discussed previously in conjunction with FIG. 3.

In one form, a laterally-outermost part of the B-surface 250B that corresponds to the second region 252B defines at least a portion of a seat belt rerouter 255 that may work in conjunction with retractor 174 to help change directions for a seat belt 171 reserve contained within the retractor 174. As will be understood, a locking unit may also be included in order to grip the seat belt 171 in case of an accident or related vehicular impact. The rerouter 255 is widely used for so-called three-point restraint systems and can be mounted, for example, on the B-pillar 150 of the vehicle 10 and can then pivot to accommodate movement of the seat belt 171 and the individual being restrained. The rerouter 255 may be provided to contact the seat belt 171 in order to help keep the webbing surface from being in contact with the pillar 150 or other surfaces in the interstitial region between the pillar 150 and the B-surface 250B of the garnish 250 than it ordinarily would be. This in turn may help bias the latch 173 away from the A-surface 250A of garnish 250 such that contact between them is reduced.

Retractor 174 may provide continuous tension on seat belt 171. In this way, the latch 173 may remain at least partially suspended to minimize or eliminate contact with the garnish 250, at least when vehicle 10 is stationary, while the inclusion of the recessed portion of the latch-receiving structure 252 helps to minimize or eliminate such contact when vehicle 10 is moving or otherwise in an operating condition where vibrations imparted from the vehicle 10 through the chassis 20 could be expected to cause sympathetic movement in the seat belt assembly 170 in general and the seat belt 171 and latch 173 in particular. The rerouter 255 that defines the B-surface 250B contact area that corresponds to the second region 252B may be located anywhere along the height of garnish 250 to provide additional tension to the belt 171, so long as it does not interfere with other components placed within the interstitial space between the pillar 150 and the B-surface 250B of the garnish 250. In addition, this rerouter 255 may be made integral with the adjacent portion of garnish 250. Furthermore, when made using the injection molding assembly 300 of FIG. 5B, could be relatively easily formed in that it would extend along the draw direction, which in turn could avoid the use of slides or related undercut mechanisms (none of which are shown) inside the tool, which in turn would provide the additional functionality without an increase in tooling costs that are traditionally associated with such undercut features. Furthermore, eliminating the slide may allow for the inclusion of other features that may be incorporated into the B-surface 250B of garnish 250.

Rerouter 255 may be any shape conducive to supporting at least a portion of seat belt 171 that is present in the interstitial space between the B-surface 250B of garnish 250 and its corresponding pillar 150. Likewise, rerouter 255 may be any shape conducive to preventing seat belt 171 from twisting during its travel along the mating surface of rerouter 255. Moreover, the amount of projection that the rerouter 255 extends toward the pillar may be greater that n that needed to provide a housing-like enclosure of a mobile phone or other personal communication device that may be placed in the second region 252B; with this extension, the portion of the B-surface 250B that defines the rerouter 255 can remove excess slack in the belt 171. Furthermore, the rerouter 255 may provide some resistance against the force of the retractor 174, such that the latch 173 may be held without significant ability to move during typical vehicle 10 travel.

Thus, by one form of the present recessed portion of the latch-receiving structure 252 configuration, the garnish 250 in general and the B-surface 250B that corresponds to the second region 252B in particular assumes additional functionality by having it sized and shaped to accept common forms of mobile phones and related communication devices, as well as perform a rerouting function for seat belt 171. It will be appreciated that in one form, the recessed portion of the latch-receiving structure 252 may include one of these additional functionality features, while in another form, it may include both.

Figure 5B:
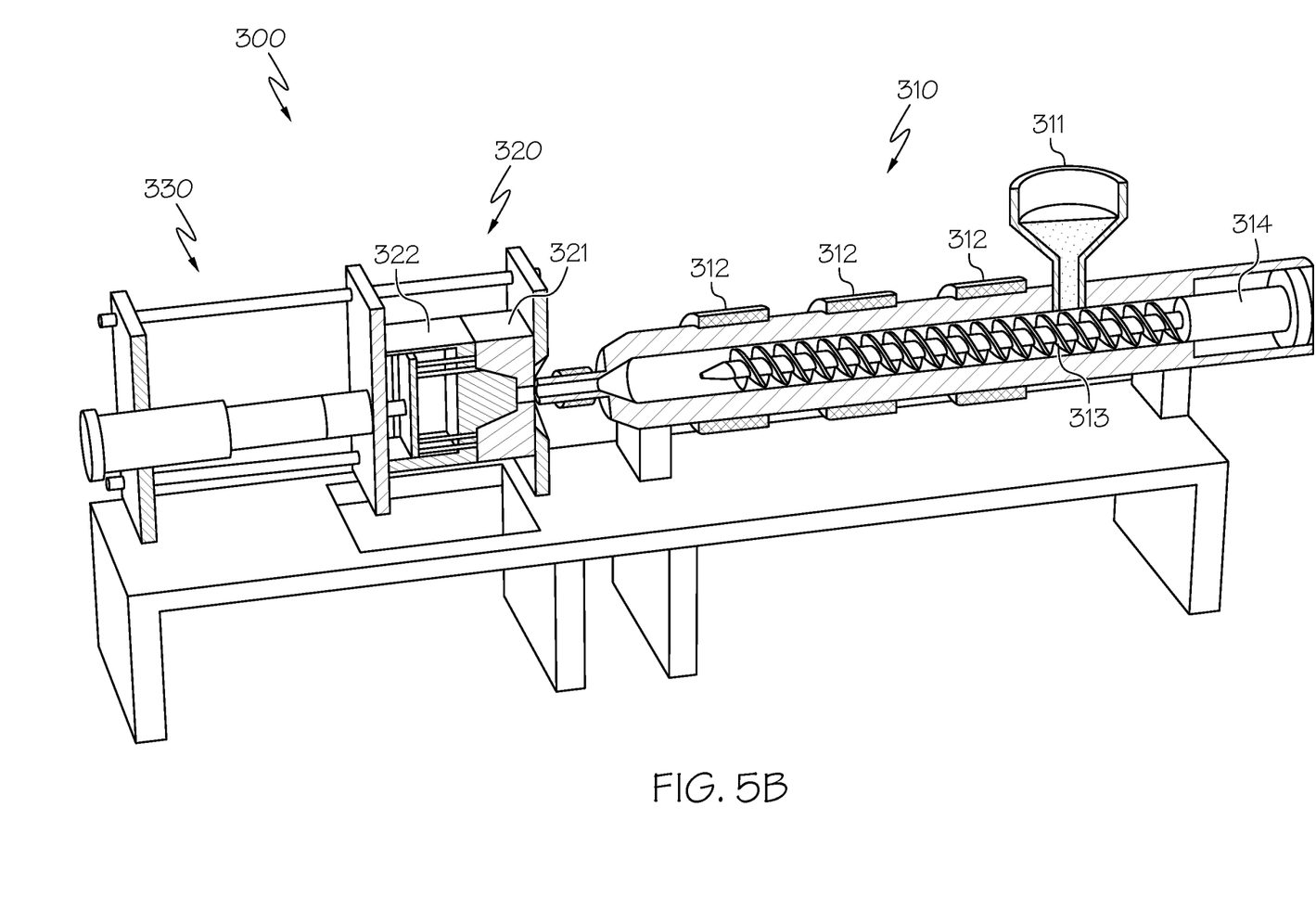
FIG. 5B depicts an injection molder that can be used to form the garnish of FIGS. 3, 4 and 5A.

Referring next to FIG. 5B, an injection molding assembly 300 that may be used to form the garnish 250 used to cover B-pillar (as well as the corresponding garnish used to cover C-pillars 160 or D-pillars) and the respective recessed portion of the latch-receiving structure 252 of such garnish 250. In one form, the assembly 300 may include three major sections corresponding to an injection unit 310, a molding unit 320 and a clamping unit 330. The injecting unit 310 may include a hopper 311 for containment of a plastic resin (in, for example, bead or pellet form) or related precursor material, which is then fed into a cylindrical injection chamber where one or more stages of heaters 312 surround the chamber and an auger 313 that rotates in response to power from motor 314. Thus, upon receipt of precursor a material such as pelletized polypropylene into the hopper 311, the heaters 312 are activated in order to at least partially melt the pellets in order to promote ease of flow once the melt enters into the cylindrical injection chamber and is conveyed by the auger 313 into a pair of mold plates 321 and 322 where the former is known as the A-plate or cavity, while the latter is known as the B-plate or core. The mold plates 312, 322 define an interior cavity that is shaped in the form of garnish 250, with size, shapes, wall thicknesses or the like to enable garnish 250 to cover pillar 150. In particular, the shape of the garnish 250 includes an A-surface 250A that is configured to face the passenger compartment 50 when the garnish 250 is placed over the pillar 150 in a vehicle 10. Even more particularly, the cavity defined by the mold plates 321, 322 includes a provision for the formation of an aperture 254 formed in the A-surface 250A, as well as a B-surface 250B that is configured to face away from the passenger compartment 50 when the garnish 250 is placed over the pillar 150 in vehicle 10 to define the recessed portion of the latch-receiving structure 252 with one or both of a first region 252A and second region 252B. In another embodiment, the precursor material may already be in a melted or otherwise fluid form prior to delivery to one or more of the hopper 311, cylindrical injection chamber and auger 313 such that the heaters 312 are not required. In such event, the heating is still deemed to take place within the injection molding assembly 300 in that even though such heating may have taken place prior to receipt in the cylindrical injection chamber, such heating and consequent melting is a necessary antecedent activity to achieving the flowability of the material that is needed to deliver it to the molding unit 320. Once the mold plates 321, 322 have been filed with the molten material into a shape of garnish 250 and recessed portion of the latch-receiving structure 252, the material is hardened by cooling in the shaped mold plates 321, 322, and then forced from the shaped molding unit 320 by the action of ejectors that are disposed in the molding unit 320 or clamping unit 330. In one form, the resulting garnish 250 that is removed from the molding unit 320 defines a single, unitary part with the recessed portion of the latch-receiving structure 252.

The above-described latch-receiving structure provides a way to have vehicular pillar garnish cooperate with a seat belt and seat belt latch such that during periods where the seat belt and latch are not being used to restrain a driver or passenger in the vehicle, vibrations induced into the seat belt and latch as a result of travel or related operation of the vehicle do not result in contact-related noise within the vehicle's passenger compartment. Furthermore, the above-described latch-receiving structure includes additional features that improve functionality through one or both of electronic device storage and seat belt rerouting. Moreover, any or all of these features associated with the above-described latch-receiving structure may be formed integrally with the garnish in such a way to promote simple, low cost manufacturing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, various features of the apparatus may be combined, added, removed, reordered, modified or the like, and still be within the scope of the present disclosure, while the order of steps associated with methods to produce the apparatus may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular seat belt assembly comprising:
   a belt with a latch slidably connected thereto;
   a buckle selectively cooperative with the latch between an engaged position and a disengaged position; and
   a garnish configured to cover a vehicular pillar and disposed adjacent the belt and latch when the latch is in the disengaged position, the garnish defining an A-surface configured to face substantially away from such vehicular pillar and a B-surface configured to face substantially toward such vehicular pillar, the garnish comprising a latch-receiving structure defining a recessed portion shaped to define a first region and a second region, wherein the first region is disposed adjacent an aperture formed in the A-surface and of sufficient dimension to avoid contact between the latch and the garnish when the latch is in the disengaged position;
   wherein the second region defines a portion of the B-surface.

2. The assembly of claim 1, wherein the recessed portion comprises an integrally formed portion of the garnish.

3. The assembly of claim 1, wherein the first region is at least as wide as the latch.

4. The assembly of claim 1, wherein the depth of the first region extends away from the A-surface by at least about five millimeters beyond a maximum depthwise extension of the latch into the recessed portion.

5. The assembly of claim 1, wherein the second region is contiguous with the first region.

6. The assembly of claim 5, wherein the depth of the second region extends laterally at least about one hundred millimeters beyond the first region.

7. The assembly of claim 6, wherein the second region defines a substantially rectangular cross-sectional profile with a longitudinal dimension that is at least about seventy five millimeters in length and a height dimension that is at least about ten millimeters in length.

8. The assembly of claim 7, wherein the first region has a width dimension that is at least as wide as the width dimension of the cross-sectional profile of the second region.

9. The assembly of claim 1, wherein the second region defines a seat belt rerouter on the B-surface.

10. The assembly of claim 9, further comprising a retractor cooperative with the rerouter and belt to provide tension thereto.

11. A garnish configured to cover a vehicular pillar, the garnish comprising:
    an A-surface configured to face a passenger compartment when the garnish is placed over the pillar in a vehicle, the A-surface defining an aperture formed therein;
    a B-surface configured to face away from a passenger compartment when the garnish is placed over the pillar in a vehicle; and
    a latch-receiving structure formed within the aperture and defining a recessed portion shaped to define a first region and a second region, wherein the first region is disposed adjacent the aperture and of sufficient dimension to avoid contact between the latch and the garnish when the latch is in the disengaged position;
    wherein the second region defines a portion of the B-surface.

12. The garnish of claim 11, wherein such sufficient dimension comprises enough height, depth and width that movement of the latch does not result in contact between the latch and at any wall that forms a portion of the first region during vehicular travel.

13. The garnish of claim 11, wherein at least a portion of an outer surface defined by the second region further defines a seat belt rerouter on the B-surface, while an inner surface defined by the second region defines a substantially rectangular cross-sectional profile with a longitudinal dimension that is at least about seventy five millimeters in length and a height dimension that is at least about ten millimeters in length.

14. A method of making a vehicular pillar garnish, the method comprising:
    providing a heated material to at least a portion of an injection molding assembly;
    forcing the heated material into a mold within the injection mold assembly, the mold shaped as a garnish configured to cover a vehicular pillar, the shape of the garnish comprising an A-surface configured to face a passenger compartment when the garnish is placed over the pillar in a vehicle, the A-surface defining an aperture formed therein, a B-surface configured to face away from a passenger compartment when the garnish is placed over the pillar in a vehicle and a latch-receiving structure formed within the aperture and defining a recessed portion shaped to define a first region and a second region, wherein the first region is disposed adjacent the aperture and of sufficient dimension to avoid contact between a seat belt latch and the garnish when such latch is disengaged from a seat belt buckle, wherein the second region defines a portion of the B-surface;
    cooling the material in the shaped mold; and
    ejecting the cooled material from the shaped mold.

15. The method of claim 14, further comprising molding the recessed portion integrally with the garnish within the mold.

16. The method of claim 15, wherein the latch-receiving structure is shaped such that the shaped mold defines no additional undercuts therein due to the first and second regions.

17. The method of claim 16, wherein the second region defines a substantially rectangular cross-sectional profile with a longitudinal dimension that is at least about seventy five millimeters in length and a height dimension that is at least about ten millimeters in length.

18. The method of claim 14, wherein providing a heated material to at least a portion of an injection molding assembly comprises heating the material until it achieves a substantially molten state prior to forcing the heated material into the mold.

19. The method of claim 18, wherein when the heated material comprises polypropylene.

\* \* \* \* \*